United States Patent
Stentz et al.

(10) Patent No.: US 7,272,474 B1
(45) Date of Patent: Sep. 18, 2007

(54) METHOD AND SYSTEM FOR ESTIMATING NAVIGABILITY OF TERRAIN

(75) Inventors: Anthony Stentz, Pittsburgh, PA (US); Carl Knox Wellington, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 145 days.

(21) Appl. No.: 11/096,333

(22) Filed: Mar. 31, 2005

Related U.S. Application Data

(60) Provisional application No. 60/558,231, filed on Mar. 31, 2004.

(51) Int. Cl.
  *G01C 21/26* (2006.01)
  *G01C 21/28* (2006.01)
  *G01C 21/00* (2006.01)

(52) U.S. Cl. .......................... 701/26; 701/28; 701/223

(58) Field of Classification Search ................ None
See application file for complete search history.

(56) References Cited

U.S. PATENT DOCUMENTS

| | | | |
|---|---|---|---|
| 6,678,590 B1 * | 1/2004 | Burchfiel ................. | 701/28 |
| 2004/0039498 A1 * | 2/2004 | Ollis et al. ............... | 701/23 |
| 2005/0096802 A1 * | 5/2005 | Han et al. ................. | 701/4 |

OTHER PUBLICATIONS

Wellington et al.; Learning Predictions of the Load-Bearing Surface for Autonomous Rough-Terrain Navigation in Vegitation; 4th Intl. Conf. on Field and Service Robots, Jul. 14-16, 2003.*

Madhavan et al.; Information-based intellegent unmanned ground vehicle navigation; Intellegent Robots and Systems, 2003; IEEE; vol. 4, pp. 3485-3490; Oct. 27, 2003.*

Cristian S. Dima, Nicolas Vandapel and Martial Hebert, Classifier Fusion for Outdoor Obstacle Detection.

Cristian S. Dima, Nicolas Vandapel & Martial Hebert, Sensor & Classifier Fusion for Outdoor Obstacle Detection: an Application of Data Fusion To Autonomous Off-Road Navigation.

Nicolas Vandapel and Martial Hebert, Finding Organized Structures in 3-D Ladar Data (Continued)

*Primary Examiner*—Michael J Zanelli

(57) ABSTRACT

A method and system for detecting an obstacle comprises a terrain estimator for estimating a local terrain surface map based on at least one of range data points, color data, and infrared data gathered by electromagnetic perception focused in front of a vehicle. The map is composed of a series of terrain cells. An analyzer estimates at least one of predicted roll data, predicted pitch data, predicted ground clearance data, and predicted friction coefficient data based on the estimated terrain map for respective terrain cells and vehicular constrain data. A local planner determines predicted vehicle control data for terrain cells within the terrain along a planned path of the vehicle. One or more vehicle sensors sense at least one of actual roll data, actual pitch data, actual ground clearance data, and actual friction coefficient data for the terrain cells when the vehicle is coextensively positioned with the corresponding terrain cell. A learning module adjusts at least one of the terrain map estimation and the control data determination based on the sensed actual data.

36 Claims, 10 Drawing Sheets

OTHER PUBLICATIONS

Alex Yahja, Anthony Stentz, Sanjiv Singh & Barry L. Brumitt Framed-Quadtree Path Planning for Mobile Robots Operating in Sparse Environments, In Proceedings, IEEE Conference on Robotics and Automation, (ICRA), Leuven, Belgium, May 1998.

Anthony Stentz, Optimal and Efficient Path Planning for Partially-Known Environments, In Proceedings, IEEE International Conference on Robotics and Automation, May 1994.

John Hancock, Dirk Langer, Martial Hebert, Ryan Sullivan, Darin Ingimarson, Eric Hoffman, Markus Mettenleiter, Christoph Froehlich, Active Laser Radar for High-Performance Measurements, Proceedings of the 1998 IEEE International Conference on Robotics & Automation, Leuven, Belgium, May 1998.

John Hancock, Eric Hoffman, Ryan Sullivan, Darin Ingimarson, Dirk Langer, Martial Hebert, High-Performance laser range scanner, SPIE Proceedings on Intelligent Transportation Systems, 1999.

Cristian Dima, Martial Hebert and Anthony Stentz, Enabling Learning from Large Datasets: Applying Active Learning to Mobile Robotics.

Anthony Stentz, Alonzo Kelly, Peter Rander, Herman Herman, Omead Amidi, Robert Mandelbaum, Garbis Salgian, Jorgen Pedersen, Real-Time Multi-Perspective Perception for Unmanned Ground Vehicles.

Anthony Stentz, Constrained Dynamic Route Planning for Unmanned Ground Vehicles.

Anthony Stentz, Map-Based Strategies for Robot Navigation in Unknown Environments. : In Proceedings AAAI 96 Spring Symposium on Planning with Incomplete Information for Robot Problems.

Nicolas Vandapel, Omead Amidi and J. Ryan Miller, Toward Laser Pulse Waveform Analysis for Scene Interpretation.

Nicolas Vandapel, Raghavendra R. Donamukkala and Martial Hebert, Quality Assessment of Traversability Maps from Aerial LIDAR Data for an Unmanned Ground Vehicle.

D. Langer, J. K. Rosenblatt and M. Hebert, A Behavior-Based System for Off-Road Navigation.

Anthony Stentz and Martial Hebert, A Complete Navigation System for Goal Acquisition in Unknown Environments. In Autonomous Robots, vol. 2, No. 2, Aug. 1995.

D. Langer, J. K. Rosenblatt and M. Hebert, An Integrated System for Autonomous Off-Road Navigation.

Kazuya Yoshida and Hiroshi Hamano, Motion Dynamics of a Rover With Slip-Based Traction Model, Proceedings of the 2002 IEEE International Conference on Robotics & Automation, Washington, DC, May 2002.

Karl Iagnemma and Steven Dubowski, Terrain estimation for high-speed rough-terrain autonomous vehicle navigation.

Alonzo Kelly and Anthony Stentz, An Approach to Rough Terrain Autonomus Mobility, International Journal of Autonomous Robots, Feb. 1997.

A. Talukder, R. Manduchi, R. Castano, K. Owens, L. Matthies, A. Castano, R. Hogg, Autonomous Terrain Characterisation & Modelling for Dynamic Control of unmanned vehicles.

Christopher Rasmussen, Combining Laser Range, Color, and Texture Cuses for Autonomous Road Following.

Tsai-Hong Hong, Christopher Rasmussen, Tommy Chang, and Michael Shneier, Fusing Ladar and Color Image Information for Mobile Robot Feature Detection and Tracking.

P. Bellutta, R. Manduchi, L. Matthies, K. Owens, A. Rankin, Terrain Perception for DEMO III.

\* cited by examiner

Navigaion Data Map
  1st Cell Location Data
    Navigable (Yes or No)
  2nd Cell Location Data
    Navigable (Yes or No)
      •
      •
  Nth Cell Location Data
    Navigable (Yes or No)

} FIG. 7

Control Path Data Map
  1st Cell Location Data
    Vehicular Speed
    Vehicular Acceleration
    Vehicle Heading/ Orientation
  2nd Cell Location Data
    Vehicular Speed
    Vehicular Acceleration
    Vehicle Heading/ Orientation
      •
      •
  Nth Cell Location Data
    Vehicular Speed
    Vehicular Acceleration
    Vehicle Heading/ Orientation

} FIG. 8

Feedback Data Map
  1st Cell Location Data
    Actual Ground Height Data
    Actual Roll/ Pitch Data
    Actual Speed Data
    Actual Acceleration Data
    Actual Steering Angle Data
  2nd Cell Location Data
    Actual Ground Height Data
    Actual Roll/ Pitch Data
    Actual Speed Data
    Actual Acceleration Data
    Actual Steering Angle Data
      •
      •
  Nth Cell Location Data
    Actual Ground Height Data
    Actual Roll/ Pitch Data
    Actual Speed Data
    Actual Acceleration Data
    Actual Steering Angle Data

} FIG. 9

Terrain Data Map
　1st Cell (E.g., Voxel) Location Data
　　　Average Cell Terrain Height
　　　Cell Terrain Type/ Class
　　　Lowest Cell Terrain Height
　　　Deviation from Planar Cell Surface
　2nd Cell (E.g., Voxel) Location Data
　　　Average Cell Terrain Height
　　　Cell Terrain Type/ Class
　　　Lowest Cell Terrain Height
　　　Deviation from Planar Cell Surface
　　　　　•
　　　　　•
　Nth Cell (E.g., Voxel) Location Data
　　　Average Cell Terrain Height
　　　Cell Terrain Type/ Class
　　　Lowest Cell Terrain Height
　　　Deviation from Planar Cell Surface

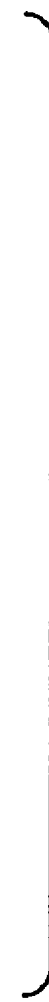

FIG. 10

METHOD AND SYSTEM FOR ESTIMATING NAVIGABILITY OF TERRAIN

CROSS-REFERENCE TO RELATED APPLICATIONS

The present invention claims priority from U.S. Provisional patent application Ser. No. 60/558,231, filed Mar. 31, 2004, and which is incorporated herein by reference.

STATEMENT REGARDING FEDERALLY SPONSORED RESEARCH AND DEVELOPMENT

This invention was made with government support under contract NCC-5-223 awarded by the National Aeronautics and Space Administration. The government may have certain rights in this invention.

FIELD OF THE INVENTION

This invention relates to a method and system for estimating navigability of terrain.

BACKGROUND OF THE INVENTION

Vehicles, machines, and robots may be configured for manned or unmanned operations in off-road environments where the local features of terrain are not fully known. In the prior art, vehicle designers relied on the observation and control of the operator to avoid roll-over of the vehicle, striking objects with low vehicle-to-ground clearance, or other problems with negotiating rugged terrain. However, if vehicle is configured for unmanned operation or for operator-assisted operation, there is need to configure the vehicle for replicating, simulating, or even enhancing the observation and control of a human operator to negotiate rugged terrain safely and efficiently.

SUMMARY OF THE INVENTION

A method and system for estimating the navigability of terrain comprises a terrain estimator for estimating a terrain map based on range data points gathered by electromagnetic perception from a vehicle. The map is composed of a series of terrain cells. An analyzer estimates at least one of predicted roll angle data, predicted pitch angle data, and predicted ground clearance data, based on the estimated terrain map for at least one respective terrain cell and vehicular constraint data. A local planner determines predicted vehicle control data for terrain cells within the terrain along a planned path of the vehicle. One or more vehicle sensors sense at least one of actual roll angle data, actual pitch angle data, and actual ground clearance data for the respective terrain cell or cells when the vehicle is coextensively positioned with the corresponding terrain cell. A learning module adjusts at least one of the terrain map estimation, the vehicle state data, and the vehicle control data determination based on the sensed actual data.

BRIEF DESCRIPTION OF THE DRAWINGS

FIG. 7 illustrates one possible data structure for an exemplary navigation data map.

FIG. 8 illustrates one possible data structure for an exemplary control path data map.

FIG. 9 illustrates one possible data structure for an exemplary feedback data map.

FIG. 10 illustrates one possible data structure for an exemplary terrain data map.

DESCRIPTION OF THE PREFERRED EMBODIMENT

Figure 1:
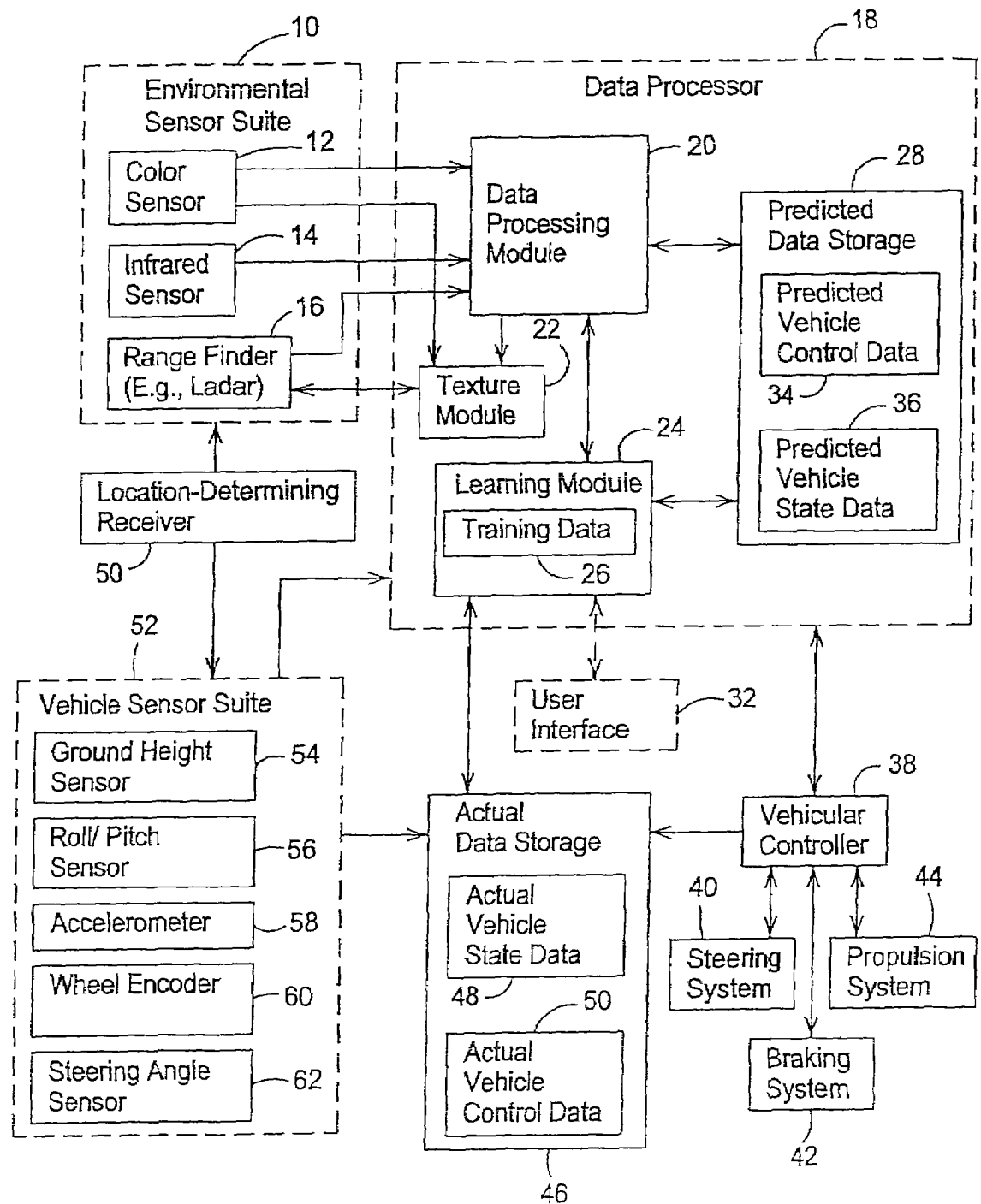
FIG. 1 is a block diagram of a system for estimating the navigability of terrain (e.g., off-road terrain) by a vehicle.

In FIG. 1, a location-determining receiver 50 communicates with an environmental sensor suite 10 and a vehicle sensor suite 52. In turn, the environmental sensor suite 10 communicates with a data processor 18. The vehicle sensor suite 52 communications with the data processor 18 and actual data storage 46. The data processor 18 is associated with a vehicular controller 38. Although a user interface 32 is not required, the data processor 18 may be coupled to an optional user interface 32. The vehicular controller 38 provides control signals to one or more of the following: a steering system 40, a braking system 42, and a propulsion system 44.

The data processor 18 comprises a data processing module 20, a texture module 22, a learning module 24, and predicted data storage 38. The predicted data storage 28 may store the results of estimation of predicted vehicle control data 34 and predicted vehicle state data 36, based on sensed terrain data and vehicular constraint data.

The location-determining receiver 50 (Global Positioning System receiver with differential correction) provides location data of the vehicle to facilitate the division of the work area about the vehicle into a group of terrain cells. Each terrain cell may be associated with terrain characteristics derived from sensed attributes sensed by the environmental sensor suite 10. Accordingly, each terrain cell may be associated with cellular values for color data, infrared data, and the range data points. Each range data point may represent a three-dimensional coordinate defined in Cartesian or polar coordinates or a location data point that is defined with reference to a vector between a range finder 16 and a spatial point associated with the terrain or an object. The vector may comprise a distance component and a bearing component (e.g., compound angle or an angles defined with reference to one or more orthogonal planes). The range data points are used to derive or express the general position, shape, elevation, and dimensions of physical terrain features. Although each terrain cell may be defined a unique terrain cell identifier, in an alternate embodiment the coordinates, position data (or range thereof) or location data associated with a corresponding terrain cell may be used as a cell identifier.

In one embodiment, the environmental sensor suite 10 comprises a color sensor 12, an infrared sensor 14, and a range finder 16. The color sensor 12, infrared sensor 14, and the range finder 16 provide environmental data on the terrain or environment around the vehicle (e.g., in front of the vehicle). The color sensor 12 outputs color data 102 on the ground, vegetation, terrain, objects occupying the terrain, or other features of the terrain. The infrared sensor 14 outputs infrared data on the ground, vegetation, terrain, obstacles, persons, animals or other features of the terrain. The range finder 16 may scan the ground or terrain in the zone in front of or about the vehicle to produce a grid or constellation of data points. For instance, the range finder 16 or ladar emits a radio frequency signal (e.g., optical signal or infra-red) aimed at one more observed points of the terrain and receives a reflection of the radio frequency signal where the elapsed time between emission and receipt indicates distance of the observed point from the vehicle. The range finder 16 or ladar may be used to scan a zone in front of the vehicle on a point by point basis until a representational grid, constellation, or matrix of the relative positions of the terrain or ground features is established for a desired resolution.

Ladar refers to a laser radar system. A range finder 16 or laser distance meter is scanned and directed at known directions. For the scanned areas where at least two angles or a vector are known for an observed point, three-dimensional data or a three-dimensional image may be generated in real time as the vehicle is moved throughout terrain. A scanning ladar system may have range from a few meters to over 100 meters and a depth resolution within a range of 1 centimeter to about 20 centimeters. Ladar systems, and other systems and components described herein, may have ranges, resolutions, and other parameters which are greater than or less than the examples provided herein. The resultant three-dimensional image, acquired through ladar scan, may be super-imposed on coordinates (i.e., geo-referenced) from the location-determining receiver 50.

In one embodiment, the environmental sensor suite 10 is focused on a zone (within a certain maximum radius) in front of the vehicle or in the direction of planned or anticipated travel of the vehicle. The maximum radius depends on the sensitivity, the desired accuracy of the environmental sensor suite 10, and the planned velocity (e.g., maximum velocity) of the vehicle. The greater the velocity, the greater the maximum radius needs to be to be able to process and react to observed data in time to avoid an obstacle or hazard. In general, the accuracy of the environmental sensors decline with increasing distance from the vehicle.

The vehicle sensor suite 52 comprises vehicular state sensors that provide information about the vehicular pose of the vehicle at a corresponding position (e.g., particular terrain cell) provided by the location-determining receiver 50. The vehicle sensor suite 52 may comprise one or more of the following: a ground height sensor 54, a roll/pitch sensor 56, an accelerometer 58, a wheel encoder 60, and a steering angle sensor 62. In alternative embodiments, the vehicle sensor suite may include a wheel height sensor, a suspension component height sensor to derive a roll angle or/and pitch angle. Further, in another alternate embodiment, the wheel slippage may be measured, for example, by comparison of a wheel encoder 60 associated with the wheel axis and a gyro associated with the vehicle body or another rotational encoder associated with the engine output shaft, crankshaft, or transmission output shaft of the vehicle. It is generally understood by one of ordinary skill in the art that roll/pitch sensors 56 may be implemented by one or more inclinometers, optical sensors, or accelerometers. In addition, other sensors and devices referenced herein may be implemented in a variety of ways using, for example, gyroscopes, accelerometers, optical sensors, global positioning systems, and other sensors and devices.

The ground height sensor 54 determines the measurement from a reference point on the vehicle to the ground to measure variations in the ground height beneath the vehicle. The roll/pitch sensor 56 measures the roll angle and the pitch angle of a vehicle, which varies with the local topography of the terrain. The accelerometer 58 measures acceleration of the vehicle or a component thereof; acceleration represents a change in velocity of the vehicle or a component thereof. A wheel encoder 60 measures the rotational speed or angular displacement of a wheel. A gyro may be used to measure the rotation of wheel or a shaft, for example. The steering angle sensor 62 measures the steering orientation of the steerable wheels of the vehicle with respect to time.

The texture module 22 accepts color data and range data from the environmental sensor suite 10 and outputs texture data or density data that indicates mass per unit volume of objects or portions of the terrain. A texture of higher relative density indicates a solid object or obstacle (e.g., in contact with the ground), whereas a texture of lower relative density tends to indicate the presence of vegetation (e.g., a crop or ground cover).

The data processing module 20 develops a terrain map based on the environmental input from the environmental sensor suite 10 and analyzes the terrain map and the vehicular constraints to output a navigability map for the vehicle. The terrain map may be divided into a series of cells and may express the following items on a per cell basis: average terrain height, lowest point, and deviation from a generally planar reference surface. Similarly, the navigability map may be divided into a series of cells, wherein each cell is classified as safely navigable by the vehicle or not navigable in accordance with a set of vehicular constraints maximum speed, physical specifications and dimensions, turning radius, vehicle stability and roll-over. The navigability of a cell or region may vary with vehicle characteristics, speed, velocity, steering angles, and other vehicular constraints.

The vehicular sensor suite 52 provides vehicular data on the actual vehicular state of a vehicle. The actual data storage 46 may be used to store actual vehicle state data 46 and actual vehicle control data 50 outputted by the vehicle sensor suite 52.

The learning module 24 compares the predicted state of a vehicle for a particular terrain cell to the actual state of the vehicle for the particular cell, where available. The relationship or error between the actual state and the predicted state of the vehicle or between the actual control signal and the predicted vehicular control signal may be used to alter the algorithms (e.g., for terrain estimation, kinematic analysis, or both) used by the data processing module 20. For example, the terrain estimator 106 and the analyzer 112 may use coefficients that can be adjusted from feedback data (e.g., actual vehicle state data 48 or actual vehicle control data 50) from the vehicle sensor suite 52 in accordance with the instructions of the learning module 24. The learning module 24 may store pairs of input/output data called training data 26 to refine the predictive coefficients made or used by the data processing module 20.

The user interface 32 is shown as dashed lines because the user interface is optional. The user interface 32 may support the ability of a human operator of a vehicle to conduct a survey of the terrain to identify cells or location data for cells that are untraversable or traversable with certain limitations. Further, the user interface 32 may support an operator's ability to associate a cellular location, location data (e.g., GPS coordinates) or coordinates with one or more of the following dangerous or unstable situations: tip-over right, tip-over left, front collision, low ground clearance, cliff, visually obscured pit, hole, stream, lake, river, swamp, or untraversable water feature, or otherwise.

Figure 2:
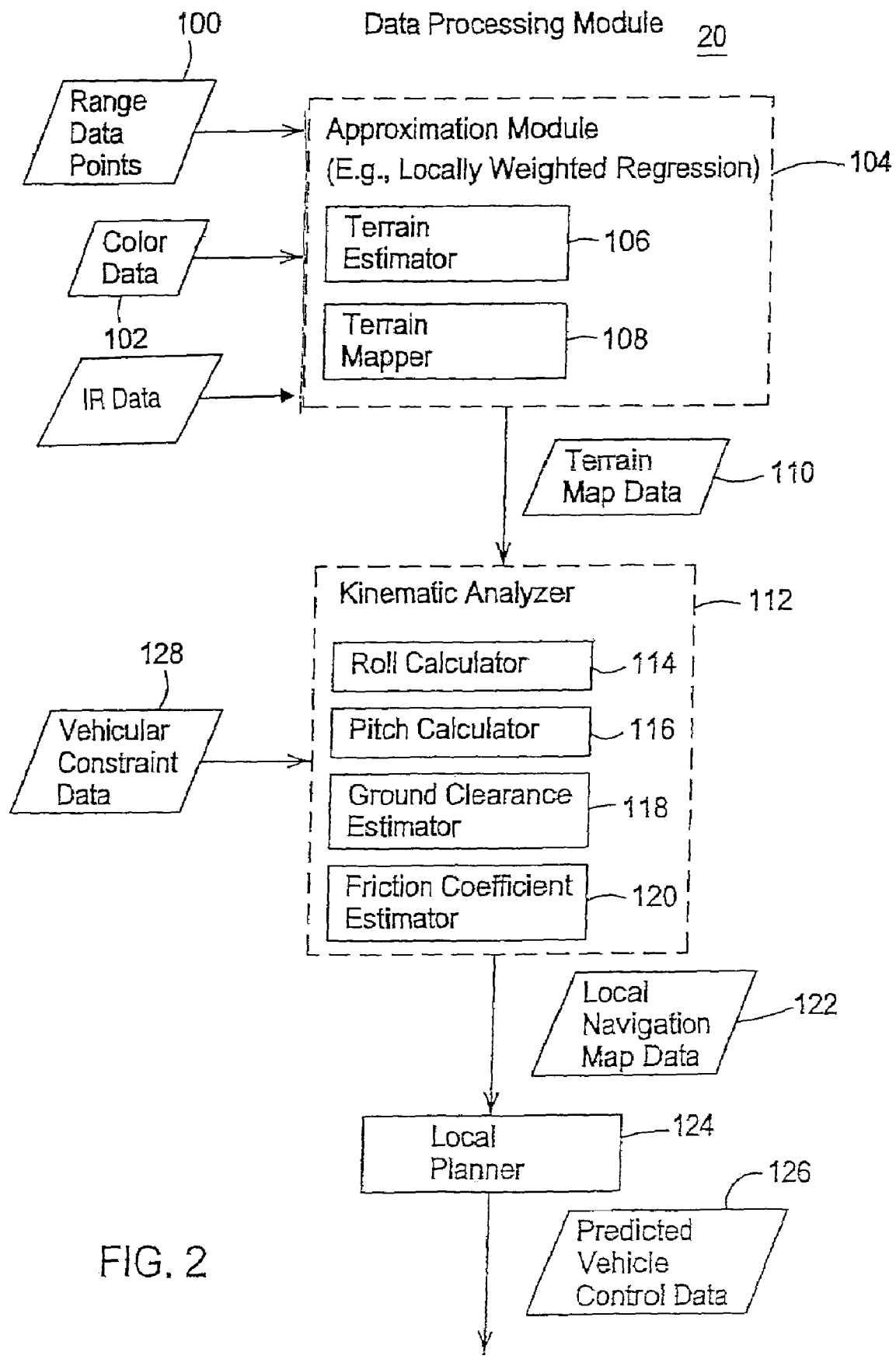
FIG. 2 is a block diagram the illustrates the data processing module of FIG. 1 in greater detail.

FIG. 2 shows the data processing module 20 of FIG. 1 in greater detail. The data processing module 20 comprises an approximation module 104 that communicates to a kinematic analyzer 112. In turn, the kinematic analyzer 112 communicates with a local planner 124. The local planner 124 may plan a route or local path plan in the immediate proximity of the vehicle within a zone in front of the vehicle or in the direction of travel, whereas a global planner plans the global route of the vehicle in an entire work area. The local planner 124 works on a dynamic basis and the size or extent of the local planning zone may increase with increasing velocity of the vehicle or decrease with decreasing velocity of the vehicle.

In one embodiment, the approximation module 104 comprises a locally weighted regression (LWR) approximation module 104. The approximation module 104 estimates the parameters of a nonlinear function (e.g., a cost function) associated with navigation of terrain (e.g., off-road terrain). LWR may use a Gaussian distribution or another kernel function to weigh the data points differently such that closer data to a query point is given greater weight than farther data in predicting the future vehicle state or future vehicle control state. Under LWR, a prediction may be locally modeled as a linear regression model about a query point and the data points are weighted in accordance with a Gaussian distribution that depends upon their distance from the query point. The function is generally linear about the query point provided that the bandwidth of the Gaussian distribution is adequately limited.

In an alternate embodiment, the approximation module 104 comprises a neural net, a radial basis function, a variant of linear weighted regression, or the like.

As shown in FIG. 2, the approximation module 104 comprises a terrain estimator 106 associated with the terrain mapper 108. Range data points 100 or scanned ladar data is inputted into the approximation module 104. Although color data 102 is not required, color data 102 may be inputted as well to identify the presence or absence of vegetation, the type of ground or soil (e.g., clay, sand, gravel, concrete, blacktop, paved or unpaved surface). Infrared data is not required, but it may be used to identify, for example, people, animals, or other objects. The terrain estimator 106 estimates the terrain based on the inputted range data points 100 or scanned ladar data. The terrain mapper 108 may provide a tabular, textual, graphical, or other representation of the terrain map or terrain map data 110 on a cell by cell basis. The approximation module 104 outputs terrain map data 110 to the kinematic analyzer 112.

The kinematic analyzer 112 accepts an input of the terrain map data 110 and vehicular constraints. The vehicular constraints may relate to physical specifications of the vehicle, dimensions, stability, roll-over resistance, ground clearance, turning radius, cruising speed, fuel capacity, maximum range, and the like. The kinematic analyzer 112 outputs a local navigation data map or local navigation map data 122.

The kinematic analyzer 112 may comprise one or more of the following: a roll calculator 114, a pitch calculator 116, a ground clearance calculator, and a friction coefficient estimator 120. The roll calculator 114 may use the following equation to estimate the roll angle of the vehicle in a corresponding cell based on terrain cellular data: roll=a sin $[(z_{RearLeft}-z_{RearRight})/\text{RearTrackWidth}]$, where roll is the roll angle, a sin is arc sin, $z_{RearLeft}$ is the left rear wheel height, $z_{RearRight}$ is right wheel height, and RearTrackWidth is the spacing between the left rear wheel and the right rear wheel of the vehicle. The pitch calculator 116 may use the following equation to estimate the pitch of a vehicle in a corresponding cell based on pitch cellular data: pitch=a sin $[(z_{FrontCenter}-z_{RearCenter})/\text{WheelBase}]$, where pitch is the pitch angle, a sin is arc sin, $z_{FrontCenter}$ is the height of the center for the front axle or wheel bearing, wherein $z_{RearCenter}$ is the height of the center for the rear axle or wheel bearing, and wherein the Wheelbase is the spacing between the front axle and the rear axle (or the front wheel bearing and the rear wheel bearing). The ground clearance estimator 118 may estimate clearance between a bottom of the vehicle and the ground within a corresponding cell by measuring the distance of a ground of points under the vehicle to the plane that defines the bottom of the vehicle when the suspension is bottomed out (e.g., a coil spring, leaf spring, or resilient member is fully compressed or a torsion bar is fully loaded). The friction coefficient estimator 120 may estimate the coefficient of friction of the ground within a particular cell by measuring the wheel slippage of one or more wheels with respect to the ground in comparison to the torque transmitted to the same wheel or wheels via a drive train or drive motor.

Figure 3:
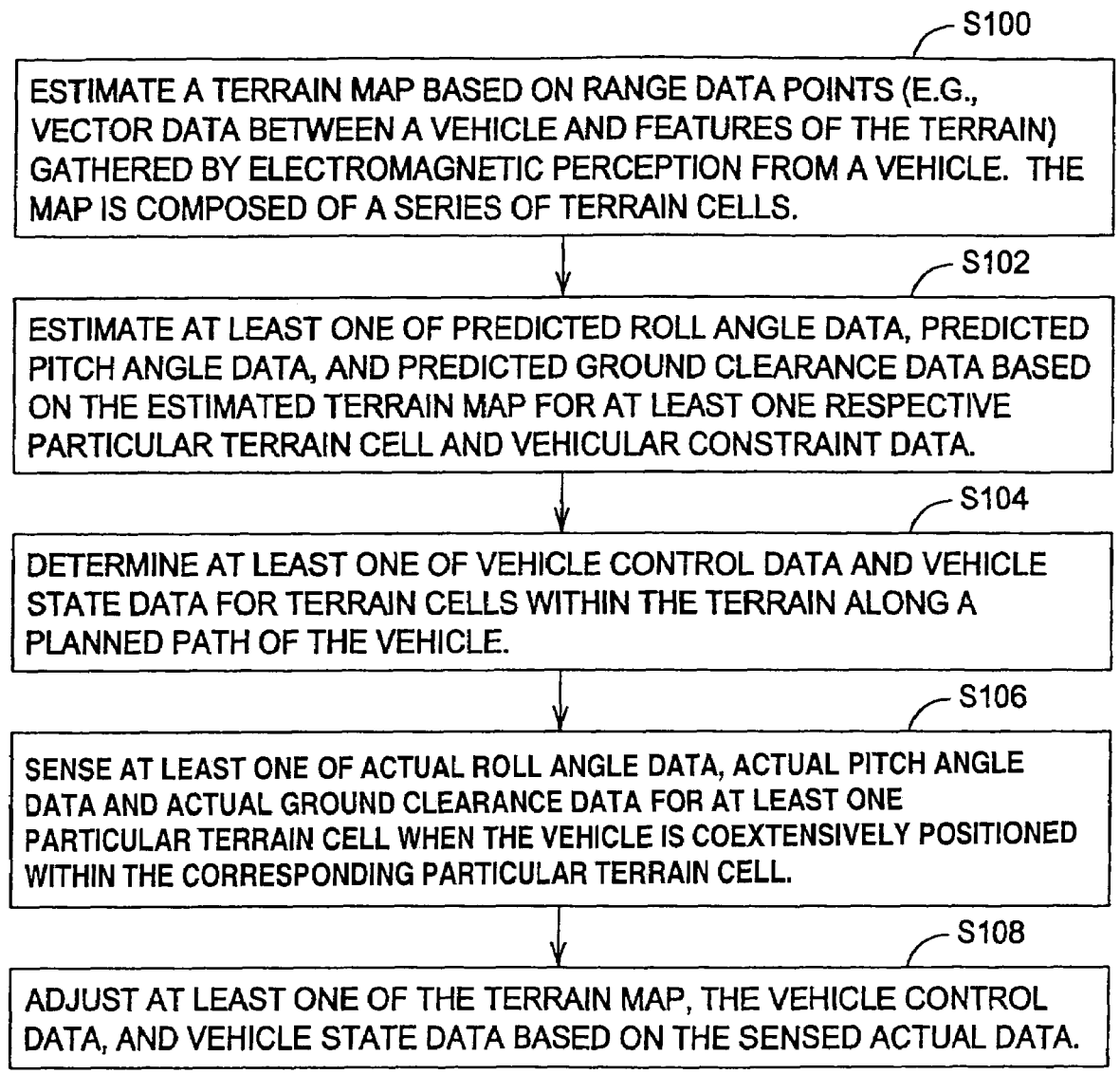
FIG. 3 is a method for estimating the navigability of terrain by the vehicle.

FIG. 3 shows a flow chart of the method for estimating the navigability of local terrain by a vehicle. The method of FIG. 3 begins in step S100.

In step S100, the estimator 106 estimates a terrain map (e.g., a local terrain surface map or local topography map) based on at least one of range data points 100, color data 102, and infrared data gathered by electromagnetic perception focused from a vehicle (e.g., focused in a zone in front of the vehicle.) The map is composed of a series of terrain cells, wherein each terrain cell is associated with corresponding environmental data that is gathered during navigation of the vehicle or by a pre-established survey of the area (e.g., satellite imagery, human observation or reconnaissance, or a survey conducted by scout vehicle) that is loaded into estimator 106 or a data processing module 20 prior to the vehicle's navigating the terrain.

Each terrain cell may correspond to one or more voxels, which represent the equivalent of a three-dimensional pixel. The voxel size is selected to be commensurate with certain vehicle dimensions. For example, the voxel may be generally rectangular with a width dimension equal to or less than a width of tires of the vehicle. The environmental sensor suite 10 collects environmental data that may be arranged as voxels.

In step S102, an analyzer 112 estimates at least one of predicted roll angle data, predicted pitch angle data, and predicted ground clearance data based on the estimated local terrain map for respective terrain cells and vehicular constraint data. In an alternate embodiment, the analyzer 112 estimates the predicted coefficient of friction data based on the estimated local terrain map.

In step S104, the local planner 124 determines predicted vehicle control data 126 for terrain cells within the terrain along a planned path (e.g., a local path plan, a global path plan, or both) of the vehicle. The global path plan may minimize a cost function (e.g., to take the shortest or quickest path from point A to point B, while avoiding collisions). The local path plan is generally consistent with the global path plan and minimization of the cost function, but allows deviations from the minimum cost function to occur to account for safety concerns, vehicular stability, unexpected obstacles, unexpected rough terrain, cellular terrain data and vehicular constraints (e.g., fuel or energy consumption or maximum range), among other possible considerations. The local planner 124 may search through velocity control data, speed control data, and steering angle commands for one or more segments of global path to consider the local conditions or characteristics of terrain cells as perceived by the vehicle on a dynamic, real-time basis. The local planner 124 selects a preferential local path in lieu of the corresponding segment of the global path plan. The preferential local path plan may be selected to be the shortest local path plan or the least cost local path, among alternative candidate local paths, that satisfies safety objectives and stable vehicle states with due consideration of terrain cells observed by the vehicle. The local planner 124 or the data processing module 20 may conduct path planning and determination of vehicle control data that conform to one or more of the following safety objectives: (1) maintaining stability of the vehicle in each cell within the planned path of the vehicle, (2) avoiding vehicle entry into any cells in which a maximum roll angle for the vehicle is predicted to be exceeded, (3) avoiding vehicle entry into any cells in which a maximum predicted pitch angle is predicted to be exceeded, (4) avoiding entry into any cell in which the minimum ground clearance for a vehicle cannot be maintained adequately in accordance with an estimate, (5) avoiding entry into any cells to avoid a vehicle collision with peaks of the ground within a cell, (6) avoiding entry into any cells where the suspension limits of a vehicle are predicted to be exceeded, and (7) avoiding cells that contain hazards or are estimated to be untraversable for any other reason. The deviation of the preferential local path from a global path plan achieves safety objectives and stable vehicle states.

In step S106, one or more sensors sense at least one of actual roll angle data, actual angle pitch data, and actual ground clearance data, for the terrain cells when the vehicle is coextensively positioned with the corresponding terrain cell. For example, previously in step S100 the vehicle estimated a predicted value of a terrain characteristic by optically or electromagnetically scanning one or more terrain cells at a distance; now in step S106 the vehicle is positioned at or drives over the same terrain cell or cells for which it made a prediction of a terrain characteristic in step S100. Step S106 facilitates comparing the predicted values of terrain characteristics of step S100 with the actual values of terrain characteristics, as made by one or more board sensors of the vehicular sensor suite 52, in step S106.

In an alternate embodiment of step S106, a sensor may sense the actual friction coefficient data for the terrain cells when the vehicle is coextensively positioned within or over the corresponding terrain cell.

In step S108, a learning module 24 adjusts at least one of the terrain map estimation, control data determination, predicted vehicle state data, future predicted vehicle control data based on the sensed actual data or a comparison of the predicted values of terrain characteristics to actual values of terrain characteristics. A mapping function may relate environmental sensor measurements of the environmental sensor suite 10 to model parameters that are used to develop a terrain map or predict vehicle states or vehicular control data. The learning module 24 accumulates representative input-output pairs or training data 26. For example, the vehicle may traverse an area around the representative terrain by tele-operation or under the control of a human operator to passively collect environmental measurement data that can be used to establish representative input-output pairs or training data for tuning of the model parameters of the data processing module 20.

Figure 4:
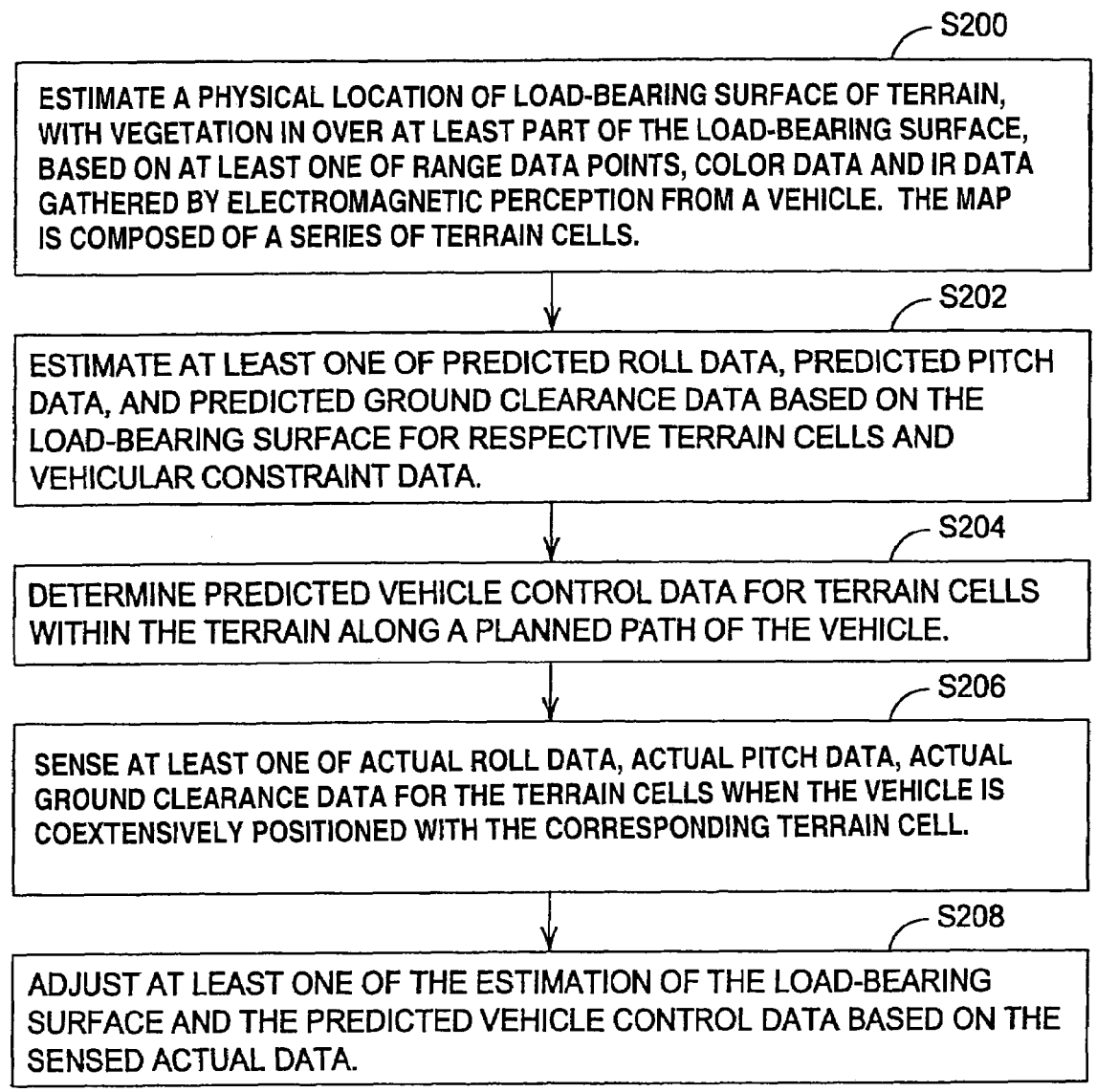
FIG. 4 is an alternate embodiment of a method for estimating the navigability of terrain by a vehicle.

FIG. 4 shows a flow chart of a method for estimating navigability of terrain. The method of FIG. 4 begins in step S200.

In step S200, a terrain estimator 106 estimates an elevation of load-bearing surface (e.g., or portions thereof) of terrain, with vegetation in over at least part of the load-bearing surface, based on range data points 100 (or larger data constellations) and color data 102 gathered by electromagnetic perception from a vehicle. A load-bearing surface is an off-road surface or ground that is capable of supporting the vehicle in a stabile manner (e.g., without any material shift in elevation from the mass of the vehicle). The map is composed of a series of terrain cells. For example, the terrain estimator 106 may use locally weighted regression (LWR) to establish the relationship between data point features detected by the range finder 16 (ladar) and the true ground height in areas where the ground is covered with vegetation. Locally weighted regression can provide confidence indicators on its predictions of the elevation of the load-bearing surface for one or more cells of the terrain. In turn, the confidence indicators may be used or applied to determine whether a terrain cell is designated as navigable, or is associated with vehicular restrictions in speed, for example.

The terrain estimator 106 may use color data 102 to discriminate between cells where vegetation is present and where vegetation is absent. If vegetation is absent from a first cell or first cell cluster and if it is adjacent to a second cell or second cell cluster where vegetation is present, the estimator may collectively use the first and second cells to estimate a vegetation height. In turn, the vegetation height of a particular plant or type of vegetation may be used to estimate elevation of the load-bearing surface (e.g., ground) under the remainder of substantially similar vegetation in the same local region. For example, an estimated vegetation height may be subtracted from a uniform canopy height of a uniform crop or row crop to estimate the physical location or elevation of the load-bearing surface.

In one embodiment, the terrain estimator 106 may extract or determine one or more of the following items from voxel data or otherwise: average height of a terrain cell, a lowest point in the cell, the average height of all the points in voxels that have more hits than pass-throughs and the normalized standard deviation from a planar surface associated with fitting the elevation or topographical points within a terrain cell. Hits mean reflected or received signal captured by the receiver of the range finder 16, whereas pass-throughs mean non-reflected signals or signals that are not captured by the receiver of the range finder 10. Voxels that have a high ratio of hits to pass-throughs are likely to represent solid objects, such as a loadbearing surface. On the other hand, voxels that have a low ratio of hits to pass-throughs may represent vegetation or plant life. The standard deviation from a substantially planar fit provides an indication of how planar an area is to facilitate identifying the elevation of vegetation versus the elevation of the load-bearing surface.

In step S202, an analyzer 112 estimates at least one of predicted roll angle data, predicted pitch angle data, and predicted ground clearance data based on the load-bearing surface for respective terrain cells and vehicular constraint data.

In step S204, a local planner 124 determines predicted vehicle control data 34 for terrain cells within the terrain along a planned path of the vehicle. The local planner 124 may avoid cells where it has low confidence in its prediction or cells where the vegetation is taller or extremely dense. Alternatively, the local planner 124 may limit the velocity or speed of the vehicle in generally low confidence regions (e.g., cells or cell clusters) in which the confidence of the elevation of the loadbearing surface falls at or below a certain threshold confidence level.

In step S206, one or more vehicle sensors sense at least one of actual roll angle data, actual pitch angle data, and actual ground clearance data for the terrain cells when the vehicle is coextensively positioned with the corresponding terrain cell.

In step S208, a learning module 24 adjusting at least one of the estimation of the elevation of the load-bearing surface and the control data based on the sensed actual data.

Figure 5:
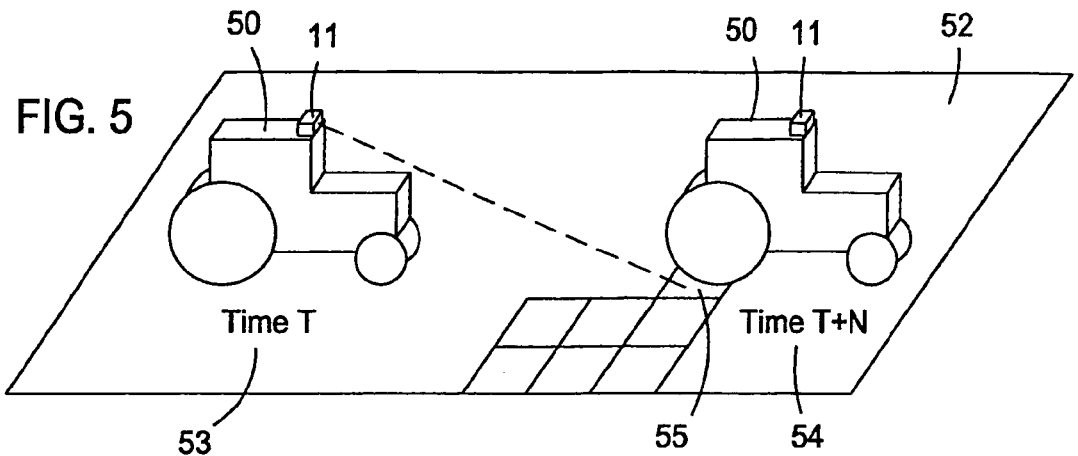
FIG. 5 is an illustration of a vehicle driving over terrain at an earlier time (e.g., time T) and a later time (e.g., time T+N).

FIG. 5 illustrates a single vehicle 50 traversing a work area that is divided into terrain cells. The vehicle 50 is shown at an earlier time (T), designated by reference number 53, and at a later time (T+N), designated by reference number 54. The earlier time corresponds to a measurement time when environmental sensors are used to gather or predict environmental data for estimating the local terrain surface map of a particular terrain cell (e.g., cell mij) in step S100. For cell mij, the subscript i indicates a cell row location and the subscript j indicates a cell column location. The later time corresponds to a measurement time when the vehicle 50 location overlies or is coextensive with the particular terrain cell when vehicle 50 sensors sense actual environmental data. The actual environmental data at the later time may be used to refine the prediction of the predicted environmental data, and the terrain map. The learning module 24 determines any refinement or action for improving the accuracy of the prediction.

Figure 6:
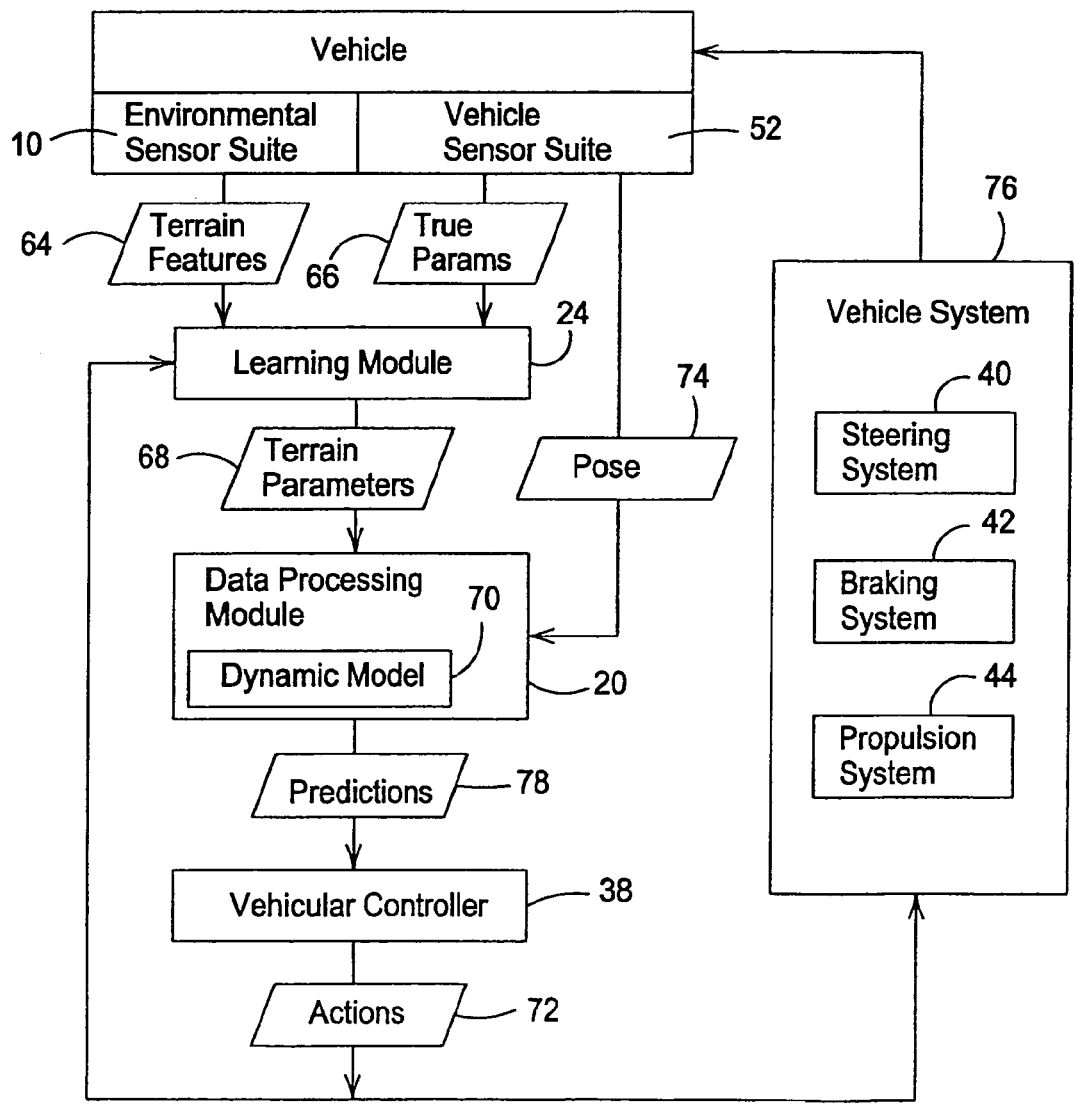
FIG. 6 is a block diagram of an alternate embodiment of a system for estimating the navigability of terrain by a vehicle.

FIG. 6 is a block diagram of a system for estimating the navigability of a terrain (e.g., rough off-road terrain). The vehicle 50 is equipped with environmental sensor suite 10 and a vehicle 50 sensor suite 52. The environmental sensor suite 10 senses environmental data from which predicted terrain features 64 are derived. The vehicle 50 sensor suite 52 senses actual environmental data and actual vehicle 50 state data 48, which may be referred to as collectively as true parameters 66. The terrain features 64 and true parameters 66 are inputted into the learning module 24. The learning module 24 outputs refined terrain parameters 68 for application to the data processing module 20. The learning module 24 applies corrections to the newly sensed environmental data to improve the accuracy of the predicted terrain features 64.

The data processing module 20 applies a dynamic model 70 with parameters that may be altered in accordance with the terrain parameters 68 and actual vehicle 50 state data 48 (or pose 74). The data processing module 20 provides predictions 78 of predicted vehicle 50 states and corresponding predicted control states to the vehicular controller 38. For example, the predicted vehicle 50 states and corresponding predicted control states may be determined with reference to a local path plan or a global path plan, and may apply to particular designated terrain cells. In turn, the vehicular controller 38 outputs action data or control data to the vehicle 50 system. The vehicle 50 system includes a steering system 40, a braking system 42, and a propulsion system 44, which are responsive to control data or actions 72 sent from the vehicular controller 38.

FIG. 7 shows an illustrative data structure for a navigation data map. The navigation data map may be organized into groups of data for each terrain cell from a first terrain cell to an Nth terrain cell, where N is any positive whole number greater than one. The different terrain cells may be distinguished from one another by unique cell identifiers (e.g., assigned codes, text, or numbers), cellular coordinates, ranges of cellular coordinates, cell boundaries, or cell location data. Each cell has a navigability indicator that indicates whether or not the cell is navigable. A cell is navigable if the vehicle can safely traverse the cell at a desired velocity or speed in a vehicle with certain specified vehicular constraints. A cell is not navigable if the vehicle is likely to become or is predicted to become unstable within a corresponding cell, or if the vehicle is likely or predicted to scrape or collide with the ground in a cell because of inadequate ground clearance.

FIG. 8 shows an illustrative data structure for a control path data map. The control path data map may be organized into groups of data for each terrain cell from a first terrain cell to an Nth terrain cell, where N is any positive whole number greater than one. The different terrain cells may be distinguished from one another by unique cell identifiers (e.g., assigned codes, text, or numbers), cellular coordinates, ranges of cellular coordinates, cell boundaries, or cell location data. Each cell is associated with at least one of a corresponding vehicular speed, vehicular acceleration, vehicle position or vehicle location data, and vehicle heading and orientation.

FIG. 9 shows an illustrative data structure for a feedback data map. The feedback data map may be organized into groups of data for each terrain cell from a first terrain cell to an Nth terrain cell, where N is any positive whole number greater than one. The different terrain cells may be distinguished from one another by unique cell identifiers (e.g., assigned codes, text, or numbers), cellular coordinates, ranges of cellular coordinates, cell boundaries, or cell location data. Each cell is associated with at least one of corresponding actual ground height data, actual roll data, actual pitch data, actual speed data, actual acceleration data, and actual steering angle data.

FIG. 10 shows an illustrative data structure for a terrain data map. The terrain data map may be organized into groups of data for each terrain cell from a first terrain cell to an Nth terrain cell, where N is any positive whole number greater than one. The different terrain cells may be distinguished from one another by unique cell identifiers (e.g., assigned codes, text, numbers, a matrix positions), cellular coordinates, ranges of cellular coordinates, cell boundaries, or cell location data. Each cell is associated with at least one of corresponding average cell terrain height, average intracellular terrain height, cell terrain class, cell terrain type, lowest cell terrain height, and deviation from planar cell surface.

Figure 11:
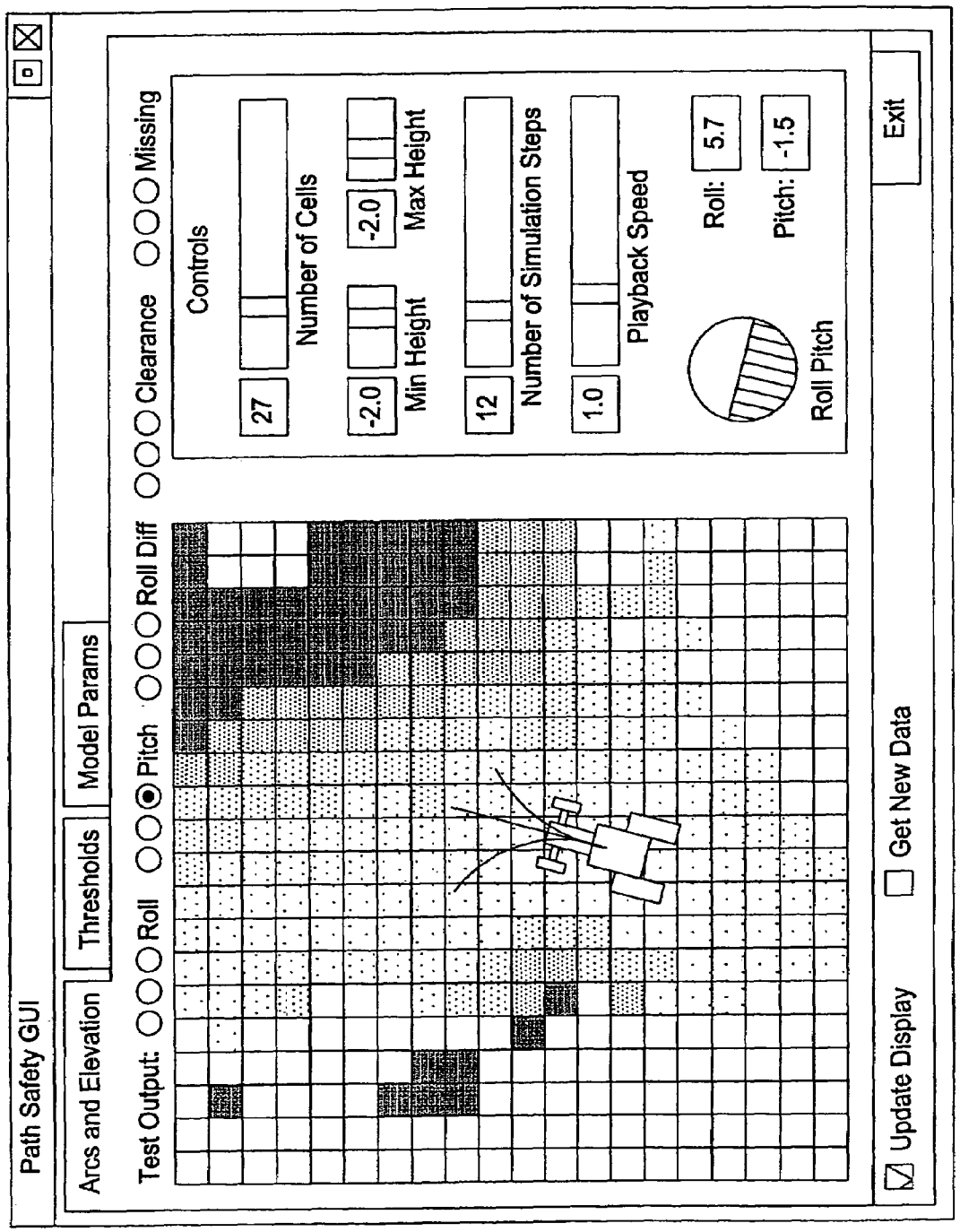
FIG. 11 illustrates display of potential local vehicle paths and prediction data via a user interface.

FIG. 11 is an illustrative screen display of a user interface 32 of the system of FIG. 1. The screen display provides an elevation map that shows the elevation within each cell. Although the elevations of cells are indicated by the density of dots in each cell in FIG. 11, in practice the shading or color of the each cell may be varied to show the elevation of the terrain. The screen display may provide statistical information on the terrain such as the number of cells, the physical cell size, minimum cell height, maximum cell height, or other statistical or topographical information on the terrain.

Although FIG. 11 show a cellular elevation map of the terrain, in an alternate embodiment or display mode the screen display may show a predicted navigability map that shows whether each cell within a work area is navigable or not. Further, the display may provide one or more of the following reasons why a corresponding cell is not navigable: (1) the roll angle of the vehicle is predicted to be exceeded within the particular cell, (2) the pitch angle of the vehicle is predicted to be exceeded within the particular cell, (3) the ground to vehicle bottom clearance is predicted to be inadequate within the particular cell, (4) environmental data for the cell is missing or inconclusive.

Figure 12:
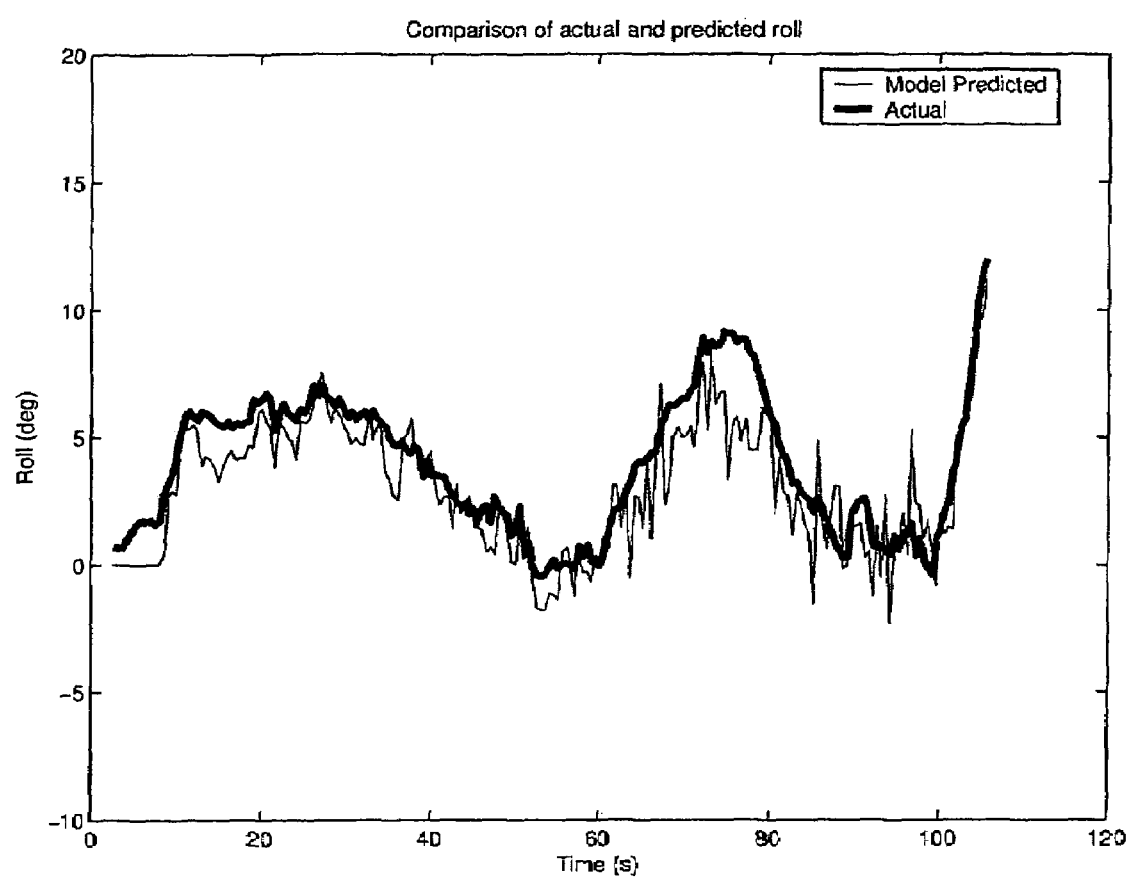
FIG. 12 illustrates a comparison of actual roll angle data and predicted roll angle data for an illustrative path of the vehicle.

FIG. 12 is a chart that compares the actual roll data to predicted roll data for a vehicle. The actual roll data is shown by the heavy or dark line, whereas the predicted roll data is shown as the narrow or light line. The vertical axis shows degrees of roll angle and the horizontal axis is time (e.g., in seconds). In FIG. 12, the predicted roll data varies at a higher frequency or rate than the actual roll data, although different results are possible in other embodiments.

Figure 13:
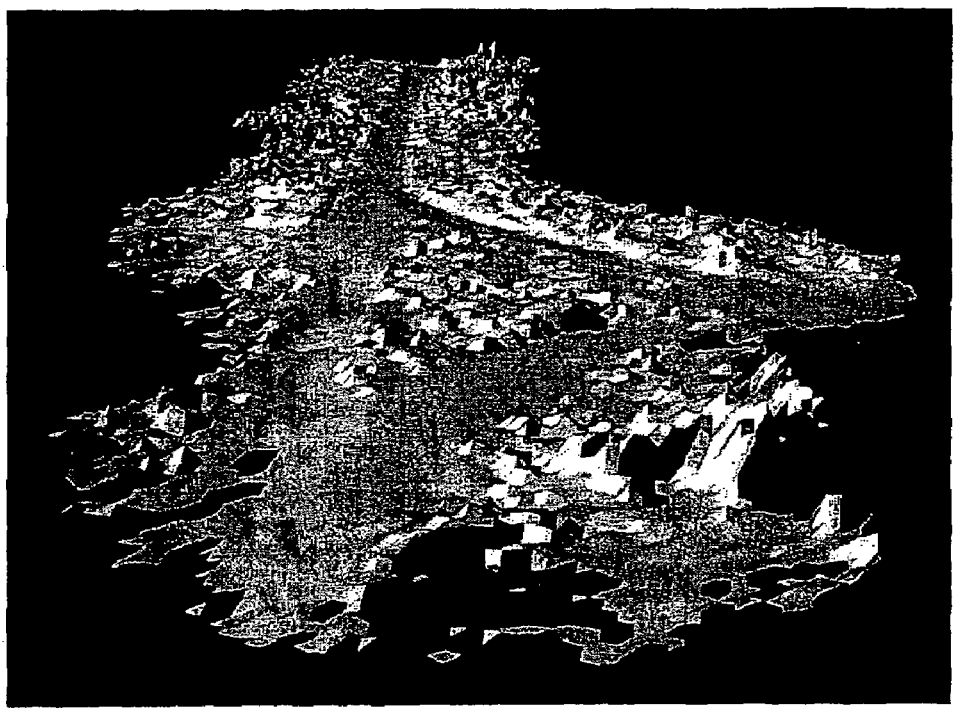
FIG. 13 illustrates exemplary terrain data expressed as an image or graphical representation.

FIG. 13 is an illustrative screen display of a user interface 32 that provides two-dimensional representation of three-dimensional terrain in a graphical manner to reveal potential hazards or unnavigable areas to an operator of the vehicle.

Figure 14:
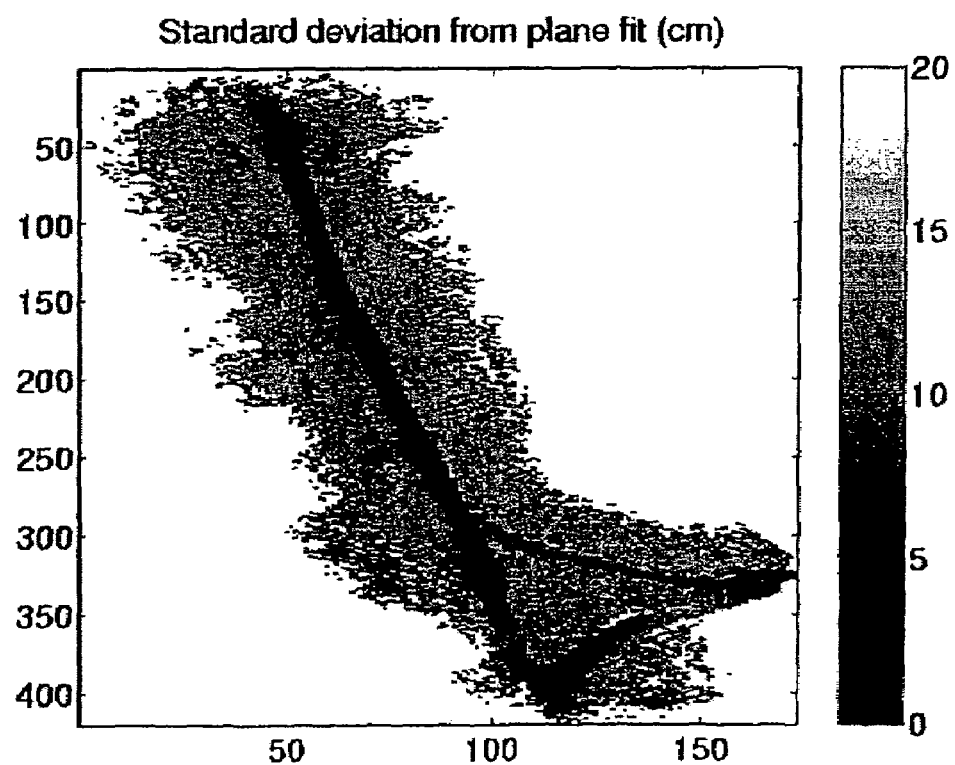
FIG. 14 illustrates the standard deviation of terrain data with reference to generally planar reference surface.

FIG. 14 is an illustrative screen display of a user interface 32 that shows standard deviation of ground elevation from a generally planar model surface. The darker areas indicate greater compliance or conformity to a generally planar surface, whereas the lighter areas or lightly shaded areas indicate less conformity to the generally planar surface. The terrain image of FIG. 14 corresponds to the terrain image of FIG. 13.

Having described the preferred embodiment, it will become apparent that various modifications can be made without departing from the scope of the invention as defined in the accompanying claims.

What is claimed is:

1. A method for estimating navigability of terrain, the method comprising:
   estimating a terrain map based on range data points gathered by electromagnetic perception from a vehicle, the map composed of a series of terrain cells;
   estimating at least one of predicted roll angle data, predicted pitch angle data, and predicted ground clearance data based on the estimated terrain map for at least one respective particular terrain cell and vehicular constraint data;
   determining at least one of vehicle control data and vehicle state data for terrain cells within the terrain along a planned path of the vehicle based on the estimations;
   sensing at least one of actual roll angle data, actual pitch angle data, and actual ground clearance data for the at least one particular terrain cell when the vehicle is coextensively positioned within the corresponding particular terrain cell for which an estimation has been made; and
   adjusting at least one of the terrain map, the vehicle control data, and vehicle state data based on the sensed actual data.

2. The method according to claim 1 wherein each terrain cell is associated with an average terrain height, a lowest point, and a deviation from a generally planar reference surface.

3. The method according to claim 1 wherein estimating of the roll angle data is estimated in accordance with the following equation:

$$\text{roll} = a\sin[(z_{RearLeft} - z_{RearRight})/\text{RearTrackWidth}],$$

where roll is the roll angle, a sin is arc sin, $z_{RearLeft}$ is the left rear wheel height, $z_{RearRight}$ is right wheel height, and RearTrackWidth is the spacing between the left rear wheel and the right rear wheel of the vehicle.

4. The method according to claim 1 wherein estimating of the pitch angle data is estimated in accordance with the following equation:

$$\text{pitch} = a\sin[(z_{FrontCenter} - z_{RearCenter})/\text{WheelBase}]$$

where pitch is the pitch angle, a sin is arc sin, $z_{FrontCenter}$ is the height of the center for the front axle, wherein $z_{RearCenter}$ is the height of the center for the rear axle or wheel bearing, and wherein the Wheelbase is the spacing between the front axle and the rear axle.

5. The method according to claim 1 wherein the estimating a terrain map comprises estimating the terrain map based on at least one of range data points, color data, and infrared data gathered by electromagnetic perception focused in front of a vehicle.

6. The method according to claim 1 wherein the estimating at least one of further comprises estimating predicted friction coefficient data based on the estimated terrain map for respective terrain cells and the vehicular constraint data.

7. The method according to claim 1 wherein the vehicular constraint data comprise one or more of the following: physical specifications of the vehicle, dimensions, stability, roll-over resistance, ground clearance, turning radius, cruising speed, fuel capacity and maximum range of vehicle.

8. The method according to claim 1 wherein the adjusting of the vehicle control data comprises selecting a preferential local path plan to maintain stability of a vehicle within each terrain cell that the planned path intercepts.

9. The method according to claim 1 wherein the adjusting of the vehicle control data comprises avoiding vehicle entry into any terrain cells in which a maximum roll angle for the vehicle is predicted to be exceeded.

10. The method according to claim 1 wherein the adjusting of the vehicle control data comprises avoiding vehicle entry into any terrain cells in which a maximum pitch angle of the vehicle is predicted to be exceeded.

11. The method according to claim 1 wherein the adjusting of the vehicle control data comprises avoiding vehicle entry into any terrain cells in which a bottom of the vehicle is predicted to collide with any peaks of the ground within the terrain cell.

12. A method for estimating navigability of terrain, the method comprising:
   estimating a terrain map of local elevation of load-bearing surface of terrain, with vegetation in over at least part of the load-bearing surface, based on at least one of range data points, color data, and infrared data gathered by electromagnetic perception from a vehicle, the map composed of a series of terrain cells;
   estimating at least one of predicted roll data, predicted pitch data, and predicted ground clearance data based on the load-bearing surface for respective terrain cells and vehicular constraint data;
   determining predicted vehicle control data for terrain cells within the terrain along a planned path of the vehicle based on the estimations;
   sensing at least one of actual roll data, actual pitch data, and actual ground clearance data for the terrain cells when the vehicle is coextensively positioned with the corresponding terrain cell for which an estimation has been made; and adjusting at least one of the estimation of the load-bearing surface and the vehicle control data based on the sensed actual data.

13. The method according to claim 12 wherein the estimating a terrain map comprises using locally weighted regression to establish a relationship between data point features detected by a range finder and the true ground height where the ground is covered with vegetation.

14. The method according to claim 13 further comprising providing a confidence indicator on the estimated local elevation of the load-bearing surface for one or more cells of the terrain.

15. The method according to claim 12 wherein for the range data points a higher density within a defined area about a target indicates a solid object or ground and a lower density about the target indicates the presence of vegetation.

16. The method according to claim 12 wherein the terrain map comprises a group of cells, wherein each cell is associated with an average terrain height, a lowest point, and a deviation from a generally planar reference surface.

17. The method according to claim 12 wherein estimating of the roll angle is estimated in accordance with the following equation:

$$\text{roll} = a\sin\,[(z_{RearLeft} - z_{RearRight})/\text{RearTrackWidth}]$$

where roll is the roll angle, a sin is arc sin, $z_{RearLeft}$ is the left rear wheel height, $z_{RearRight}$ is right wheel height, and RearTrackWidth is the spacing between the left rear wheel and the right rear wheel of the vehicle.

18. The method according to claim 12 wherein estimating of the pitch angle is estimated in accordance with the following equation:

$$\text{pitch} = a\sin\,[(z_{FrontCenter} - z_{RearCenter})/\text{WheelBase}]$$

where pitch is the pitch angle, a sin is arc sin, $z_{FrontCenter}$ is the height of the center for the front axle, wherein $z_{RearCenter}$ is the height of the center for the rear axle or wheel bearing, and wherein the Wheelbase is the spacing between the front axle and the rear axle.

19. The method according to claim 12 wherein the estimating a terrain map comprises estimating a terrain map based on range data points and color data gathered by electromagnetic perception focused in front of a vehicle.

20. The method according to claim 12 wherein the estimating at least one of further comprises estimating predicted friction coefficient data based on the terrain map for respective terrain cells and the vehicular constraint data.

21. The method according to claim 12 wherein the vehicular constraint data comprises one or more of the following: physical specifications of the vehicle, dimensions, stability, roll-over resistance, ground clearance, turning radius, cruising speed, fuel capacity and maximum range of vehicle.

22. The method according to claim 12 wherein the adjusting of the vehicle control data comprises selecting a preferential local path plan to maintain stability of the vehicle within each terrain cell that the planned path intercepts.

23. The method according to claim 12 wherein the adjusting of the vehicle control data comprises avoiding entry into any terrain cells in which a maximum roll angle for the vehicle is predicted to be exceeded.

24. The method according to claim 12 wherein the adjusting of the vehicle control data comprises avoiding vehicle entry into any terrain cells in which a maximum pitch angle of the vehicle is predicted to be exceeded.

25. The method according to claim 12 wherein the adjusting of the vehicle control data comprises avoiding vehicle entry into any terrain cells in which a bottom of the vehicle is predicted to collide with any peaks of the ground within the terrain cell.

26. A system for estimating the navigability of a terrain comprises:

an estimator for estimating a local terrain surface map based on at least one of range data points, color data, and infrared data gathered by electromagnetic perception focused in front of a vehicle, the map being composed of a series of terrain cells;

an analyzer for estimating at least one of predicted roll data, predicted pitch data, predicted ground clearance data, and predicted friction coefficient data based on the estimated terrain map for respective terrain cells and vehicular constraint data;

a local planner for determining predicted vehicle control data for terrain cells within the terrain along a planned path of the vehicle based on the estimations;

vehicle sensors for sensing at least one of actual roll data, actual pitch data, actual ground clearance data, and actual friction coefficient data for the terrain cells when the vehicle is coextensively positioned with the corresponding terrain cell for which the analyzer performed an estimation; and a learning module adjusts at least one of the terrain map estimation and the control data determination based on the sensed actual data.

27. The system according to claim 26 wherein the terrain map comprises a group of cells, wherein each cell is associated with an average terrain height, a lowest point, and a deviation from a generally planar reference surface.

28. The system according to claim 26 wherein the predicted roll angle is estimated in accordance with the following equation:

$$\text{roll} = a\sin\,[(z_{RearLeft} - z_{RearRight})/\text{RearTrackWidth}]$$

where roll is the roll angle, a sin is arc sin, $z_{RearLeft}$ is the left rear wheel height, $z_{RearRight}$ is right wheel height, and RearTrackWidth is the spacing between the left rear wheel and the right rear wheel of the vehicle.

29. The system according to claim 26 wherein the predicted pitch angle is estimated in accordance with the following equation:

$$\text{pitch} = a\sin\,[(z_{FrontCenter} - z_{RearCenter})/\text{WheelBase}]$$

where pitch is the pitch angle, a sin is arc sin, $z_{FrontCenter}$ is the height of the center for the front axle, wherein $z_{RearCenter}$ is the height of the center for the rear axle or wheel bearing, and wherein the Wheelbase is the spacing between the front axle and the rear axle.

30. The system according to claim 26 wherein the estimator estimates the terrain map based on range data points and color data gathered by electromagnetic perception focused in front of a vehicle.

31. The system according to claim 26 wherein the analyzer estimates a predicted friction coefficient data based on the estimated terrain map for respective terrain cells and the vehicular constraint data.

32. The system according to claim 26 wherein the vehicular constraint data comprises one or more of the following: physical specifications of the vehicle, dimensions, stability, roll-over resistance, ground clearance, turning radius, cruising speed, fuel capacity and maximum range of vehicle.

33. The system according to claim 26 wherein the local planner selects a preferential local path plan to maintain stability of a vehicle within each terrain cell that the planned path intercepts.

34. The system according to claim 26 wherein the local planner selects a preferential local path plan to avoid entry into any terrain cells in which a maximum roll angle for the vehicle is predicted to be exceeded.

35. The system according to claim 26 wherein the local planner adjusts the vehicle control data to avoid vehicle entry into any terrain cells in which a maximum pitch angle of the vehicle is predicted to be exceeded.

36. The system according to claim 26 wherein the local planner adjusts the vehicle control data to avoid vehicle entry into any terrain cells in which a bottom of the vehicle would collide with any peaks of the ground within the terrain cell.

* * * * *